US011321318B2

(12) United States Patent
Jiang et al.

(10) Patent No.: US 11,321,318 B2
(45) Date of Patent: May 3, 2022

(54) DYNAMIC ACCESS PATHS

(71) Applicant: International Business Machines Corporation, Armonk, NY (US)

(72) Inventors: Peng Hui Jiang, Beijing (CN); Xiao Xiao Chen, Beijing (CN); Shuo Li, Beijing (CN); ShengYan Sun, Beijing (CN); Xiaobo Wang, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 285 days.

(21) Appl. No.: 16/671,424

(22) Filed: Nov. 1, 2019

(65) Prior Publication Data
US 2021/0133195 A1 May 6, 2021

(51) Int. Cl.
*G06F 17/00* (2019.01)
*G06F 16/2453* (2019.01)
*G06N 20/00* (2019.01)
*G06F 16/2458* (2019.01)

(52) U.S. Cl.
CPC .... *G06F 16/24545* (2019.01); *G06F 16/2462* (2019.01); *G06N 20/00* (2019.01)

(58) Field of Classification Search
CPC ........... G06F 16/24545; G06F 16/2462; G06F 16/284; G06N 20/00
See application file for complete search history.

(56) References Cited

U.S. PATENT DOCUMENTS

| 7,089,347 | B2* | 8/2006 | Mogi | G06F 9/5083 |
| | | | | 711/100 |
| 10,067,849 | B2* | 9/2018 | Deng | G06F 16/2379 |
| 10,915,541 | B2* | 2/2021 | Zoheir | G06F 16/248 |
| 2008/0133454 | A1 | 6/2008 | Markl et al. | |
| 2008/0133458 | A1 | 6/2008 | Zabback et al. | |
| 2008/0195577 | A1* | 8/2008 | Fan | G06F 16/24545 |
| 2008/0222093 | A1 | 9/2008 | Fan et al. | |
| 2017/0344454 | A1* | 11/2017 | Deng | G06F 16/2322 |
| 2019/0354621 | A1* | 11/2019 | Wang | G06F 16/2453 |

OTHER PUBLICATIONS

Wolf et al., "On the Calculation of Optimality Ranges for Relational Query Execution Plans", Research 7: Tuning, Monitoring & Query Optimization, SIGMOD'18, Jun. 10-15, 2018, pp. 663-675.
Mell et al., "The NIST Definition of Cloud Computing", Recommendations of the National Institute of Standards and Technology, Sep. 2011, 7 pages.

* cited by examiner

*Primary Examiner* — Greta L Robinson
(74) *Attorney, Agent, or Firm* — Donald J. O'Brien (57) ABSTRACT

Embodiments are disclosed for a method for dynamic access paths. The method includes generating real-time statistics (RTS) estimates based on a log of a database. Further, the method includes generating access paths based on a structured query language command and the RTS estimates. The method also includes training a machine learning model to map the RTS estimates to the access paths.

17 Claims, 10 Drawing Sheets

DYNAMIC ACCESS PATHS

BACKGROUND

The present disclosure relates to relational databases, and more specifically, to generating access paths for dynamic tables in relational databases.

A relational database can be configured to represent data in relation to other data. For example, a relational database can represent data in tabular form, i.e., tables of a set of rows and columns. Additionally, the relational database can be configured to store and retrieve data using a set of relational operators that work with the tables. Further, computer applications can be configured to access the data in relational databases using these operators. More specifically, the computer applications can be configured to access data according to a predetermined access path. An access path can describe how specific items of data, i.e., attributes, are retrieved from the relational database tables.

SUMMARY

Embodiments are disclosed for a method for dynamic access paths. The method includes generating real-time statistics (RTS) estimates based on a log of a database. Further, the method includes generating access paths based on a structured query language command and the RTS estimates. The method also includes training a machine learning model to map the RTS estimates to the access paths.

Further aspects of the present disclosure are directed toward systems and computer program products with functionality similar to the functionality discussed above regarding the computer-implemented methods. The present summary is not intended to illustrate each aspect of, every implementation of, and/or every embodiment of the present disclosure.

BRIEF DESCRIPTION OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

While the present disclosure is amenable to various modifications and alternative forms, specifics thereof have been shown by way of example in the drawings and will be described in detail. It should be understood, however, that the intention is not to limit the present disclosure to the particular embodiments described. On the contrary, the intention is to cover all modifications, equivalents, and alternatives falling within the spirit and scope of the present disclosure.

DETAILED DESCRIPTION

Software engineers can configure computer applications to manipulate data in databases by writing and executing code, such as a Structured Query Language (SQL). A database can take SQL code and generate an access path that describes how to access the data specified in the SQL. More specifically, the database can use statistics about the data stored within to generate the access path. The database can periodically run utilities that collect and store these statics within the database. For example, a RUNSTATS utility can collect and store histograms documenting the tables and indices of a database. However, collecting and storing these statistics can consume a relatively large number of resources. Further, because these statistics are generated on a periodic basis, the statistics may not reflect the real-time state of the database. Tables, indices, and other database elements can change continually. As such, in some scenarios, the access path generated for a particular SQL may not represent an efficient way to access data if there are enough changes between the time the statistics are collected and the time the access path is executed.

Additionally, database utilities may not collect statistics for volatile tables. Volatile tables can include temporary data that is generated by a running computer application and deleted after the computer application finishes. For example, SQL commands, such as JOIN, GROUP BY, and ORDER BY can use volatile tables to hold data temporarily while the computer application is running. However, access paths can be generated before computer applications begin running. As such, there may not be any relevant statistics available to generate an access path for volatile tables. Thus, accesses to volatile tables may be inefficient.

Accordingly, embodiments of the present disclose can provide efficient access for SQL in databases with dynamic changes to database elements, including volatile tables. In some embodiments, users can train a machine learning module to identify a relationship between real-time statistics (RTS) about the database and access paths that can be efficiently executed against the database. Real-time statistics can represent dynamic changes to the database, including how many rows have been inserted, deleted, and otherwise updated since the last periodic update of the database statistics. Accordingly, as data is inserted and deleted from tables during execution of a computer application, the database can use this machine learning module to select an access path based on RTS that represent how data in the database has changed in real time. In this way, efficient access paths can be selected and executed even when accessing data in a dynamic database, and volatile tables.

Figure 2:
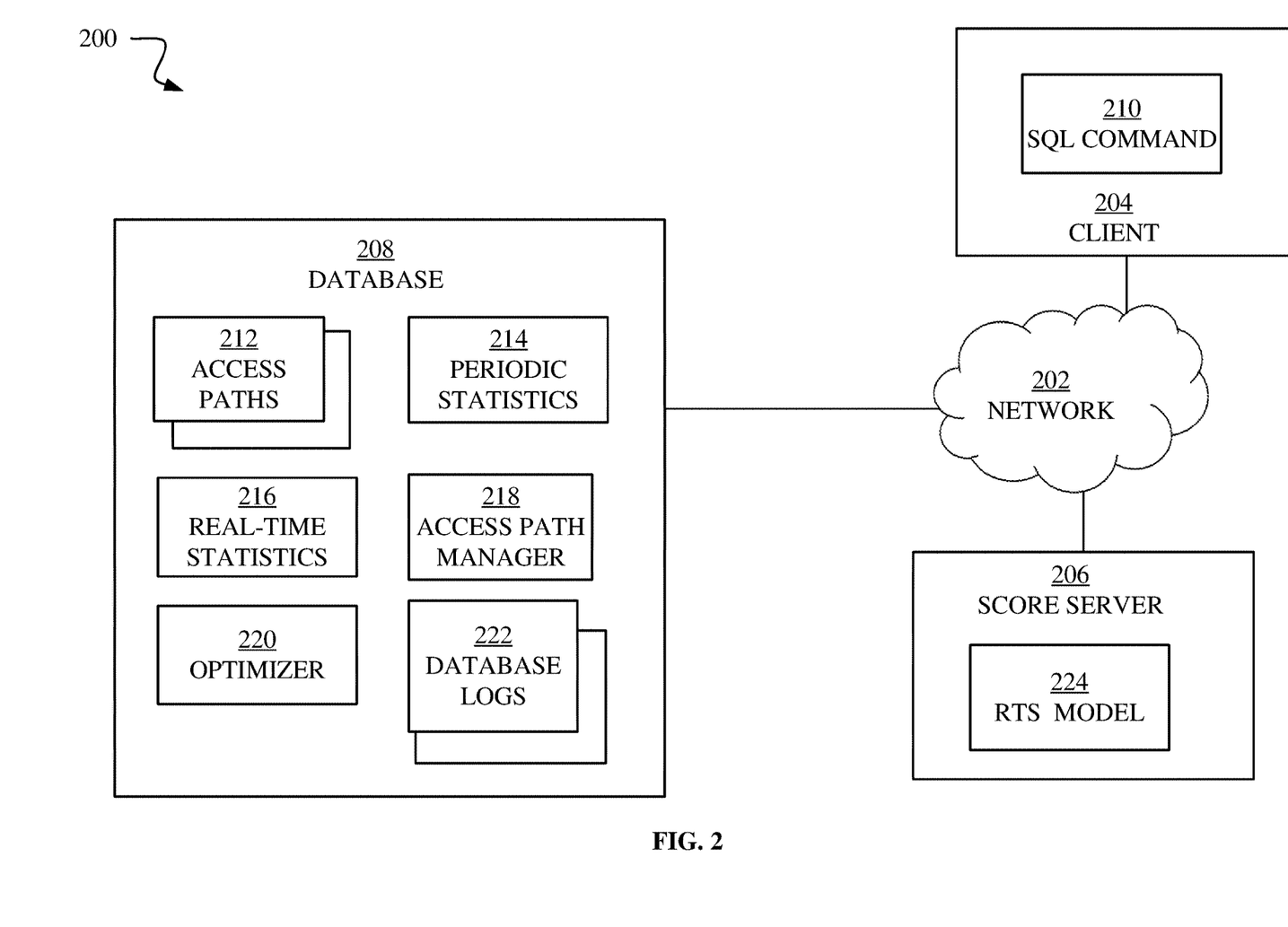
FIG. 2 is a block diagram of a system for dynamic access paths, in accordance with some embodiments of the present disclosure.

Efficiency of following a specific access path can be determined according to multiple variables, such as, the processing time involved, the number of steps in scanning a table or index, the amount of memory involved, and the like. Thus, for example, if an efficiency evaluation is based on the number of steps, the access path 212 that uses the relatively fewest steps of the generated access paths 212 may be selected for run-time execution. According to some embodiments of the present disclosure, the efficiency evaluation can be learned by training a machine learning model.

Figure 1:
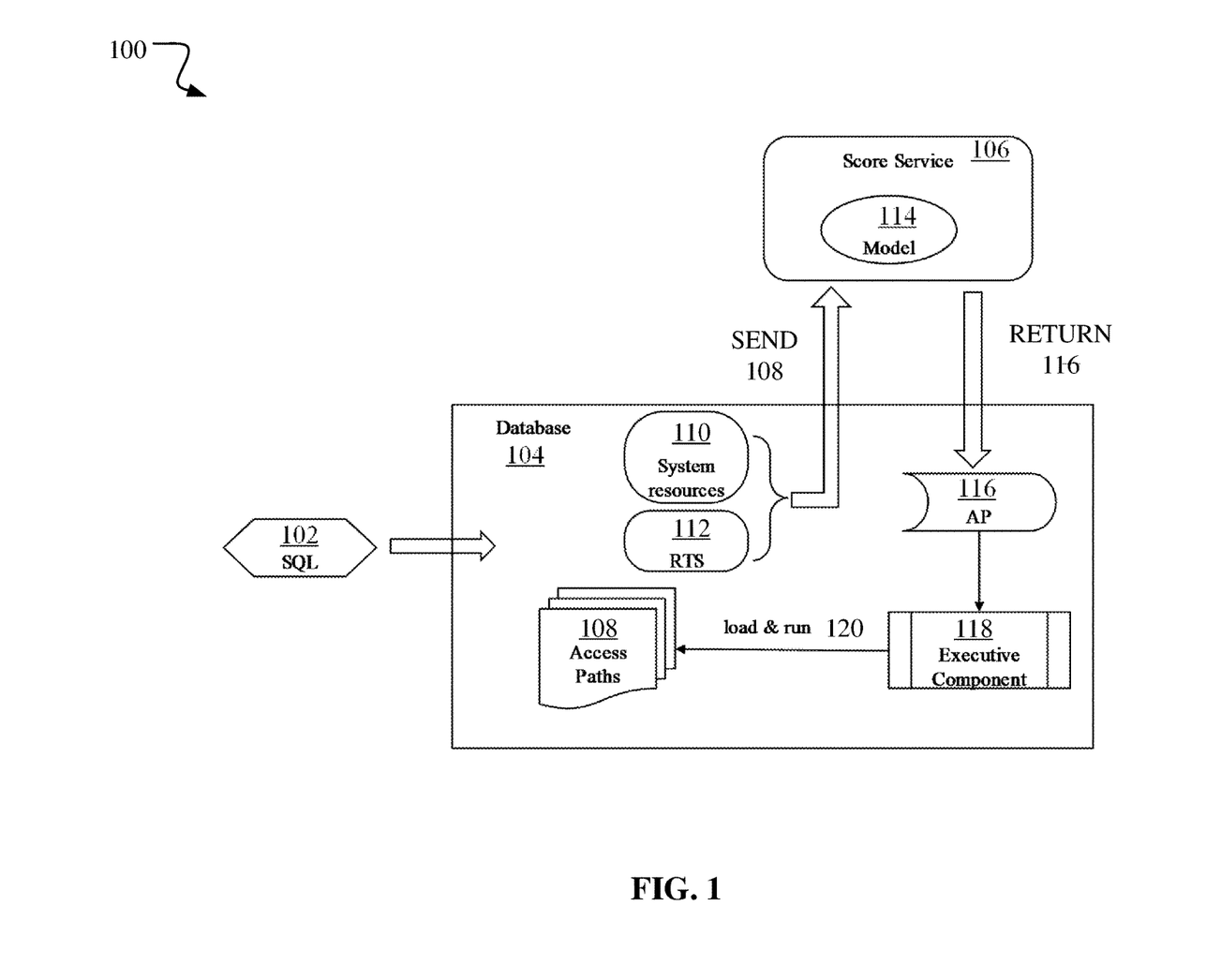
FIG. 1 is a data flow diagram of a system for dynamic access paths, in accordance with embodiments of the present disclosure.

FIG. 1 is a data flow diagram of a system 100 for dynamic access paths, in accordance with embodiments of the present disclosure. The system 100 includes SQL 102, database 104, and a score service 106. The SQL 102 can include one or more commands to direct the database to store, update, and/or retrieve data in and/or from the database 104. In some embodiments of the present disclosure, the database 104 can generate multiple access paths 108 for the SQL 102, different access paths 108 for different states of the database 104. The database state can be represented by system resources 110 and real-time statistics (RTS) 112. Additionally, the database 104 can send the database state to the score service 106, which returns an efficient access path 116. The score service 106 can include a model 114 trained to identify the efficient access path 116 based on the database state. Accordingly, the score service 106 can return the efficient access path 116 to run for a specific SQL 102 based on the database state.

Additionally, the database 104 can include an executive component 118, which can load programs into system memory for execution. Accordingly, when the database 104 receives the identity of the efficient access path 116 from the score service 106, the executive component 118 can issue a load and run command 120 to the specific access path of the access paths 108 generated for the SQL 102.

FIG. 2 is a block diagram of a system 200 for dynamic access paths, in accordance with some embodiments of the present disclosure. The system 200 includes a network 202, providing connection between a client 204, score server 206, and database 208. The network 202 can include one or more electronic communication networks, wired and wireless, ranging from near-field communication networks, through local area networks (LANS), to wide access networks (WANS). In some embodiments, the network 202 can be the Internet.

The client 204 can be any of various computing devices, such as mobile computing devices, desktop devices, servers, and the like. The client 204 can include an SQL command 210 for accessing, updating, and storing data on the database 208.

The database 208 can include access paths 212, periodic statistics 214, real-time statistics 216, access path manager 218, optimizer 220, and database logs 222. In some embodiments, the client 204 can provide one or more SQL commands 210 to the database 208 to determine efficient run-time structures for the SQL commands 210. The run-time structures, e.g., access paths 212, can vary depending on the state of the database 208. The reason for the variation is that the access paths 212 are configured for efficient access. However, changes to the database 208 can impact how efficient different access techniques can be. The state of the database 208 can be represented by the periodic statistics 214 and the real-time statistics 216. The periodic statistics 214 can include statistics about the database 208 that are stored in the database 208 and generated by database utilities (not shown) that the database 208 runs on a periodic basis. Examples of periodic statistics 214 include column cardinality, multiple column cardinality, table cardinality, the number of leaf and non-leaf pages, frequency of use, histograms, and the like. In contrast, the real-time statistics 216 can include deltas to the periodic statistics 214. The deltas can represent the changes to the database 208 since the data was stored in the periodic statistics 214. Thus, changes to the periodic statistics 214 and real-time statistics 216 can result in changes to the access paths 212.

Before the SQL command 210 is executed, the access path manager 218 can generate multiple access paths 212 for the SQL command 210. More specifically, the access path manager 218 may invoke the optimizer 220 to generate multiple access paths for the SQL command 210 based on multiple states of the database 208. Thus, each of the generated access paths 212 can represent an efficient run-time structure for the same SQL command 210, but for a different state of the database 208. Because the state of the database 208 at the time the access paths 212 are generated may not represent the state of the database 208 during execution, the access path manager 218 can estimate real-time statistics 216 for different scenarios based on the database logs 222. The database logs 222 may be a record that the database 208 maintains of transactions against the database 208. For example, each entry in the database logs 222 can represent one transaction against the database 208. A transaction can be an addition, deletion, copying, modification, and the like, of specific rows and columns in the database 208. Because real-time statistics 216 can represent a delta against the database 208, the access path manager 218 can simulate real-time statistics 216 at run-time by combining multiple logs to produce a simulated delta.

It is possible to simulate real-time statistics by using the database logs 222. In this way, it may be possible to calculate multiple unique RTS scenarios using the corresponding database log 222 and periodic statistics 214. Accordingly, it is possible to generate a mapping relationship between the real-time statistics 216 and the access paths 212 with the help of a machine learning model, such as a real-time statistics (RTS) model 224. In this way, it is possible to determine the access path 212 that efficiently performs the SQL command 210 based on the real-time statistics 216.

Further, the access path manager 218 can provide the SQL command 210, simulated RTS, and associated access paths 212 to the score server 206 to train the RTS model 224 to map real-time statistics 216 to specific access paths 212. The mapped access path can represent an efficient access path 212 for execution for the SQL command 210 when the state of the database 208 matches that represented by real-time statistics 216 corresponding to the simulated RTS.

Thus, during execution of the SQL command 210, the access path manager 218 can access the real-time statistics 216, and provide the SQL command 210 and real-time statistics 216 to the score server 206. Accordingly, the score server 206 can use the RTS model 224 to identify the access path 212 that provides efficient execution of the SQL command 210 given the current real-time statistics 216. The score server 206 can thus identify the efficient access path 212 to the database 208. Accordingly, the database 208 can execute the identified access path 212 to efficiently manipulate the data specified in the SQL command 210.

An example SQL command 210 is shown in EXAMPLE SQL COMMAND 1, below:
SELECT * FROM T
WHERE T.C1<1000
AND T.C2 BETWEEN 200 AND 600;
EXAMPLE SQL COMMAND 1

EXAMPLE SQL COMMAND 1 references one table, T, and two columns, T.C1 and T.C2. The "*" represents a wildcard, meaning that all columns in the table are displayed in a result. A result can be a report of the data in the table meeting the conditions of an SQL command. In other words, rows that meet the conditions in EXAMPLE SQL COMMAND 1 are included in the result. Thus, the result includes all rows where the value of column, T.C1, is less than a numeric 1000 value; and, where the value of column, T.C2, is in a range between the numeric values 200 and 600.

In order to produce this result, the optimizer 220 generates an access path 212 from the SQL command 210 based on the state of the database 208. The access path 212 can specify various indices, for example that the database 208 can use to access the rows meeting these conditions. An index is a tool that the database 208 uses to access data relatively quickly. The index that accesses the relevant rows in a table more quickly can vary based on how many rows in the index meet the conditions in the SQL command 210. For example, the fewer rows there are meeting the conditions for an indexed column, the more quickly the database 208 can access the rows meeting all the conditions. The table T described above can include two indices, one on column T.C1, another on column T.C2.

TABLE 1 represents three potential states of a database for the table T. These states can represent the table T at different times of the day, month, year, and the like. Additionally, the TABLE 1 indicates an efficient access path technique (run-time structure) for these states.

TABLE 1

| Total Rows | T.C1 < 1000 qualified rows | T.C2 BETWEEN 200 AND 600 qualified rows | Run-time Structure |
|---|---|---|---|
| 100 rows | 100 | 100 | Table space scan |
| 10,000 rows | 200 | 5,000 | Index(C1) |
| 1,000,000 rows | 600,000 | 8,000 | Index(C2) |

The Total Rows represent the total number of rows in table T. The column T.C1 qualified rows represents the number of rows in table T that meet the condition for column T.C1. The column T.C2 qualified rows represents the number of rows in table T that meet the condition for column T.C2. The Run-time Structure describes the technique of the access path 212. Run-time Structures can include a table space scan or an index, for example. A table space can involves reading all of the rows in the table and can be relatively less efficient than indices.

However, the first row (scenario) of TABLE 1 indicates that table T has 100 rows, and that all 100 rows meet the conditions for columns T.C1 and T.C2. As such, the indices provide no advantage over the table scan. Accordingly, for the first scenario in TABLE 1, the Run-time Structure uses a Table space scan.

The second scenario of TABLE 1 indicates that table T has 10,000 rows, that 200 rows meet the condition for column T.C1, and 5,000 rows meet the condition for column T.C2. As such, the index for column T.C1 (which involves scanning 200 rows) provides an advantage over a table space scan (which involves scanning 10,000 rows), and the index for column T.C2 (which involves scanning 5,000 rows). Accordingly, for the second scenario in TABLE 1, the Run-time Structure uses Index(C1).

The third scenario of TABLE 1 indicates that table T has 1,000,000 rows, that 600,000 rows meet the condition for column T.C1, and 8,000 rows meet the condition for column T.C2. As such, the index for column T.C2 (8,000 rows) provides an advantage over the table space scan (1,000,000 rows), and the index for column T.C1 (600,000 rows). Accordingly, for the third scenario in TABLE 1, the Run-time Structure uses Index(C2).

Accordingly, in some embodiments of the present disclosure, the access path manager 218 can generate an estimate of real-time statistics 216 for the three scenarios described above by reading the database logs 222. Further, the access path manager 218 can run the optimizer 220 with a parameter indicating the database state, e.g., periodic statistics 214 modified by the simulation of the real-time statistics 216, generated from the database logs 222. In this way, the access path manager 218 can generate access paths 212 for the database states represented in scenarios 1 through 3.

In order to select the efficient access path 212 from the generated access paths 212, the access path manager 218 can provide an SQL command 210 and the current database state to the score server 206. The score server 206 can use the trained RTS model 224 to determine the efficient access path 212 to run for the current database state. In this way, the database 208 can select the access paths 212 for scenarios 1-3 according to the Run-time Structures described above. Before execution of the SQL command 21, the score server 206 can train the RTS model 224 based on inputs from the database 208.

As referenced herein, scenarios 1-3 are mere examples of database states and access path selections. In addition to the number of rows, database states can vary as described above with respect to the periodic statistics 214 and the real-time statistics.

Figure 3:
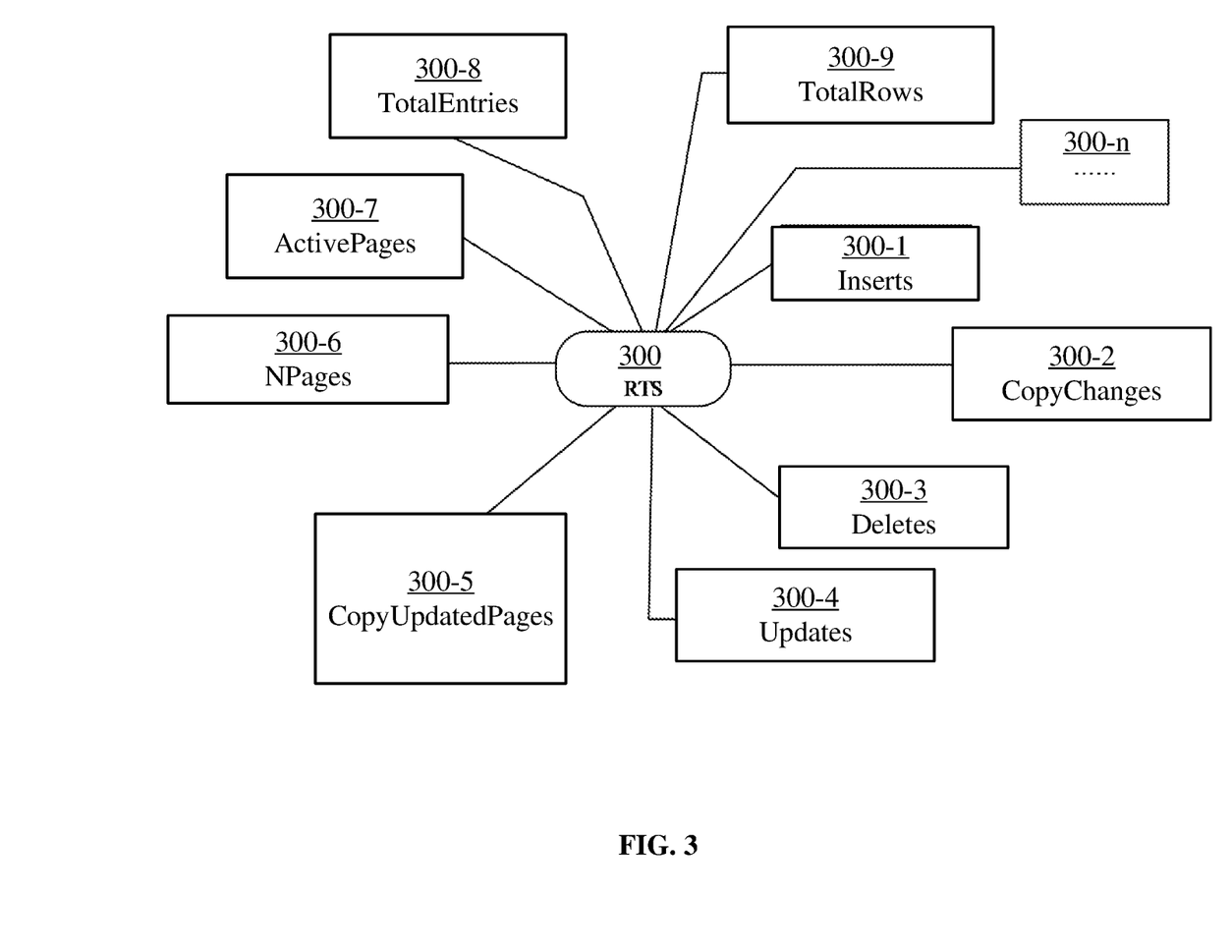
FIG. 3 is a block diagram of an example of real-time statistics, in accordance with embodiments of the present disclosure.

FIG. 3 is a block diagram of an example of real-time statistics (RTS) 300, in accordance with embodiments of the present disclosure. The real-time statistics 300 may be similar to the real-time statistics 216 described with respect to FIG. 1. Thus, references to incremental statistics herein may represent changes since the last update to the periodic statistics 214. Referring back to FIG. 3, real-time statistics 300 may include incremental statistics, including respective inserts 300-1, copy changes 300-2, deletes 300-3, and updates 300-4 against the database 208. For example, the inserts 300-1, deletes 300-3, and updates 300-4 can represent the incremental number of rows inserted into the table or index space. Table and index spaces can refer to pools of memory locations for the data stored in tables and the indices, respectively. The copy changes 300-2 can represent the incremental number of insert, update, and delete operations. Additionally, the incremental statistics can include copy updated pages 300-5, which can represent the number of different database pages that have been updated. Databases, such as the database 208 described with respect to FIG. 2, can organize data of the same table on a same memory page. In this way, the database 208 can efficiently scan the rows of a single table.

The real-time statistics 300 can also include global statistics, such as, NPages 300-6, active pages 300-7, total entries 300-8, and total rows 300-9. The global statistics can represent information about the entire database 208. For example, the NPages 300-6 can represent the number of different pages with active rows in a table and/or index space. The active pages 300-7 can represent the total number of active pages in the table and/or index space. The total entries 300-8 can represent the total number of entries in the index space. The total rows 300-9 can represent the total number of rows in the table space.

Further, the incremental and global statistics described above are mere examples of the type of incremental and global information than may be collected by the database 208. Accordingly, RTS 300-*n* can include additional and/or alternative incremental and global statistics. Accordingly, the RTS 300 makes it possible to identify potential database states in real-time.

Figure 4:
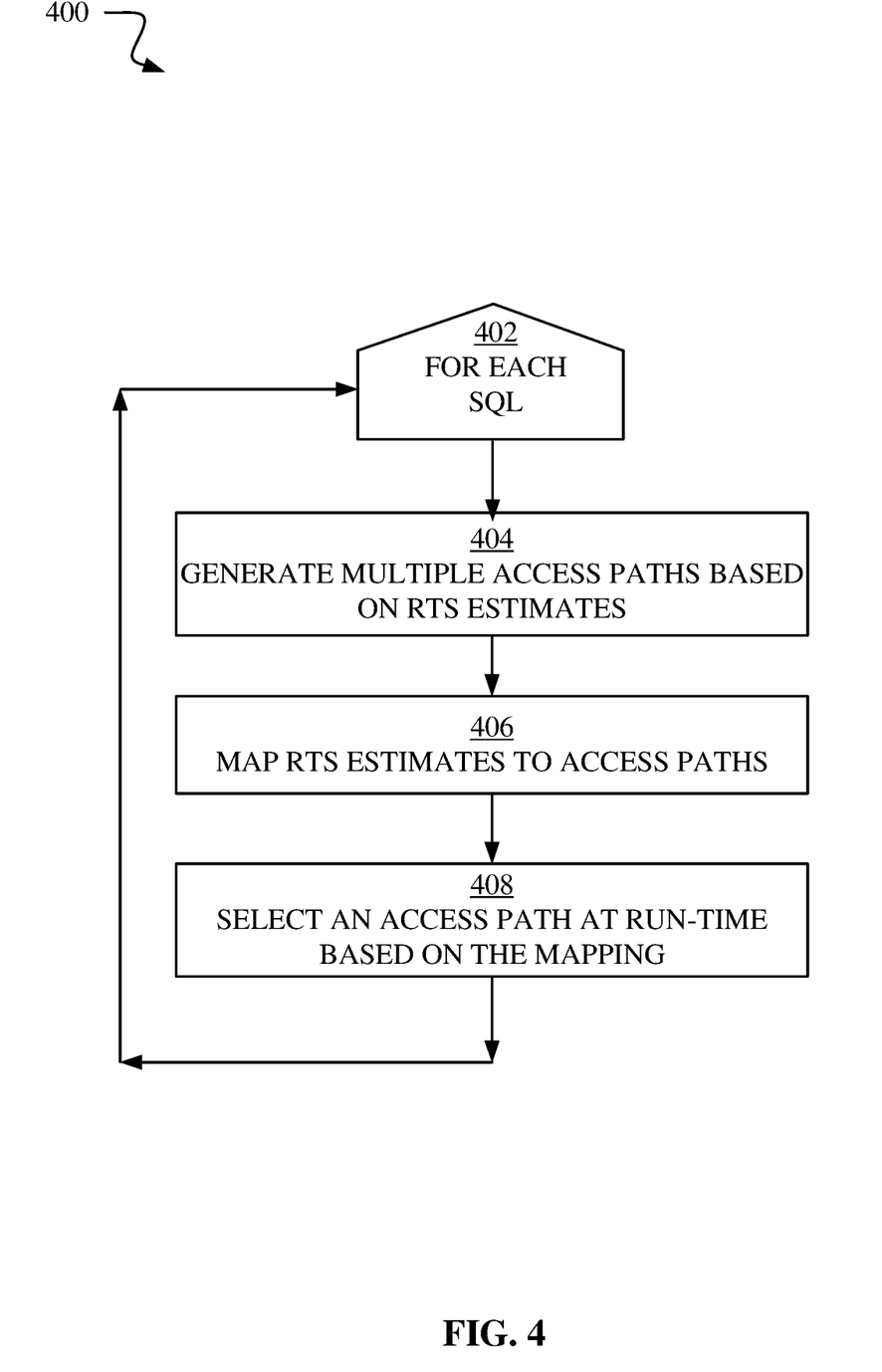
FIG. 4 is a flow chart of a method for dynamic access paths, in accordance with embodiments of the present disclosure.

FIG. 4 is a flow chart of a method 400 for dynamic access paths, in accordance with embodiments of the present disclosure. An access path manager, such as the access path manager 218 described with respect to FIG. 2, can perform the method 400. The access path manager 218 can thus perform operations 402 through 408 for each SQL, such as the SQL command 210.

At operation 404, the access path manager 218 can generate multiple access paths based on RTS estimates. As stated previously, the optimizer 220 generates an access path 212 for an SQL command 210 based on the SQL command 210 and the state of the database 208. Even though the database state at run-time is not yet known, the access path manager 218 can generate access paths 212 for multiple potential database states. An efficient access path 212 can thus be selected at run-time from the generated access paths 212.

As the current database state may not be relevant to potential run-time conditions, potential database states can be identified through the database logs 222. In a database with dynamic data conditions, it is possible to identify potential real-time statistics at different points in the historical log of the database logs 222. In this way, it is possible to generate RTS estimates by monitoring the database logs 222 for inserted and deleted data. The RTS estimates can be configured based on time intervals of the database logs 222, for example. Further, if data is changed in the database 208 with relatively high frequency, the RTS estimates can be generated by sampling the database logs 222 with a relatively high frequency, thus obtaining specific features of a potential RTS scenario. Features of a potential RTS scenario can include, for example, the insertion or deletion of specific thresholds of rows in a table or index.

At operation 406, the access path manager 218 can map the RTS estimates to the generated access paths 212. According to some embodiments of the present disclosure, the access path manager 218 can provide the RTS estimates with the generated access paths 212 to train a machine learning model, such as the RTS model 224. In this way, the RTS model 224 can learn to select an efficient access path from the generated access paths 212 based on RTS run-time scenarios. In some embodiments, the RTS run-time scenarios can include the database state, and the state of resources, such as processing and memory resources.

At operation 408, the access path manager 218 can select the efficient access path from the generated access paths 212 based on the mapping. Thus, the access path manager 218 can determine RTS at run-time for an SQL command, such as the SQL command 210. Further, the access path manager 218 can use the trained RTS model to determine the efficient access path to use based on the RTS. According to some embodiments, the access path manager 218 can identify the efficient access path to an executive component of the database, which executes the efficient access path.

Figure 5:
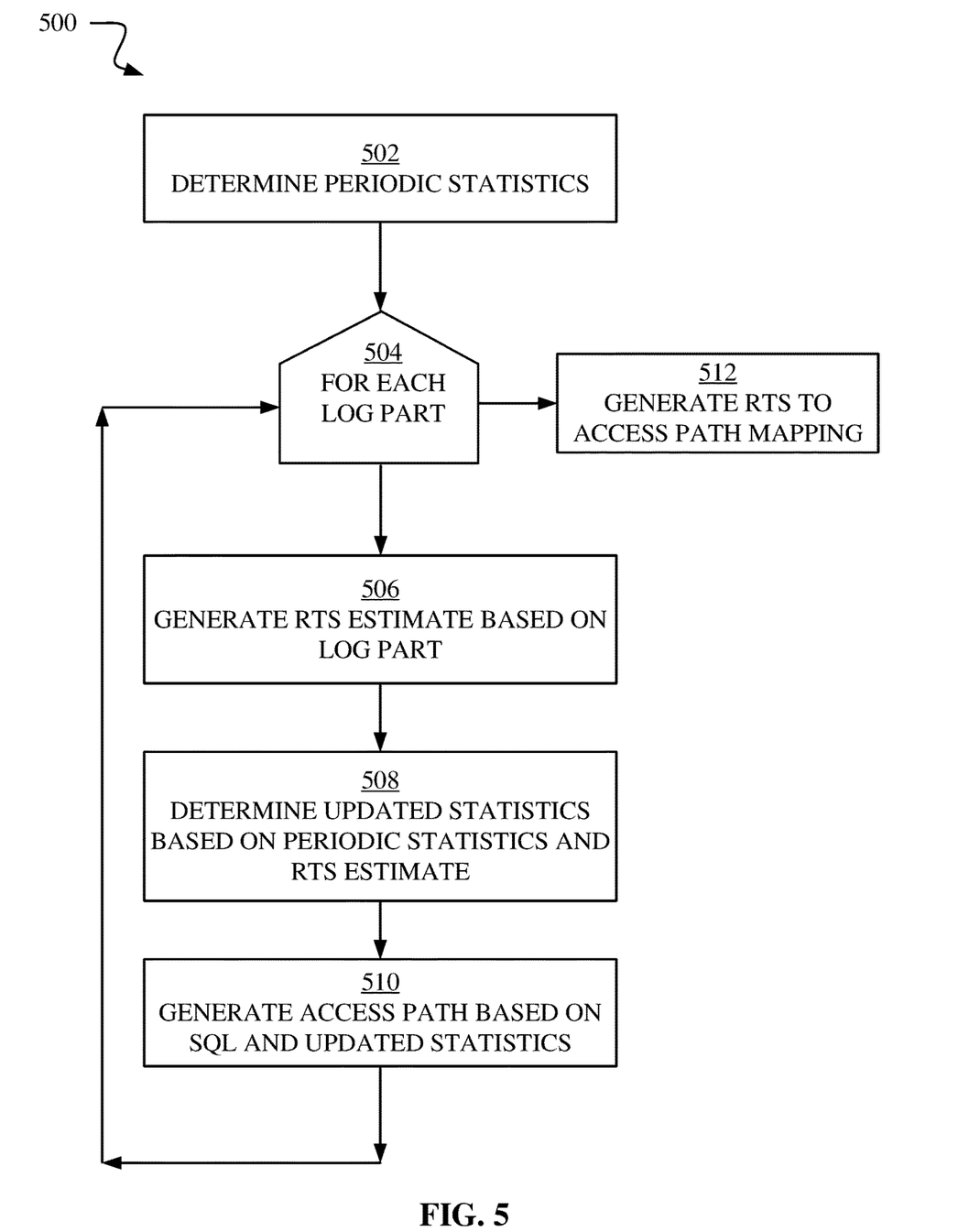
FIG. 5 is a flow chart of a method for dynamic access paths, in accordance with embodiments of the present disclosure.

FIG. 5 is a flow chart of a method 500 for dynamic access paths, in accordance with embodiments of the present disclosure. An access path manager, such as the access path manager 218 described with respect to FIG. 2, can perform the method 500.

At operation 502, the access path manager 218 can determine the periodic statistics, such as the periodic statistics 214 described with respect to FIG. 2. The periodic statistics 214 can represent a baseline against which a predetermined set of RTS estimates can be applied. As stated previously, the RTS estimates can be generated based on the database logs 222. Accordingly, the access path manager 218 can partition the database logs 222 into log parts, wherein each log part can represent an RTS estimate for a potential database state. The access path manager 218 can thus perform operations 504 through 510 for each log part. The access path manager 218 can select log parts based on potential RTS scenarios.

At operation 506, the access path manager 218 can generate an RTS estimate based on the log part. The RTS estimate can include a specific parameter set for the RTS 300 described with respect to FIG. 3, such as the number of inserts 300-1, copy changes 300-2, and so on.

At operation 508, the access path manager 218 can determine updated statistics based on the periodic statistics and the RTS estimate. The updated statistics can represent the database state in a scenario where the periodic statistics 214 are impacted by the changes represented in the logs of the log part. As such, if the periodic statistics indicate there are 10,000 rows in a table, T, and the RTS estimate indicates 90,000 rows have been inserted into table T, the updated statistics indicate that table T has 100,000 rows. The updated statistics can thus be used to generate an efficient access path for this database state.

At operation 510, the access path manager 218 can invoke the optimizer 220 to generate an access path 212 based on the updated statistics. In this way, the access path manager 218 can generate an efficient access path for various database states. The access path manager 218 can repeat operations 504 through 510 for each log part. The method 500 may then flow to operation 512.

At operation 512, the access path manager 218 can generate an RTS to access path mapping. The RTS to access path mapping can represent a machine-learned classification system that identifies an efficient access path from a group of access paths 212 based on the RTS. Thus, the access path manager 218 can determine an efficient access path for execution in real-time, when the actual RTS can be determined.

Figure 6:
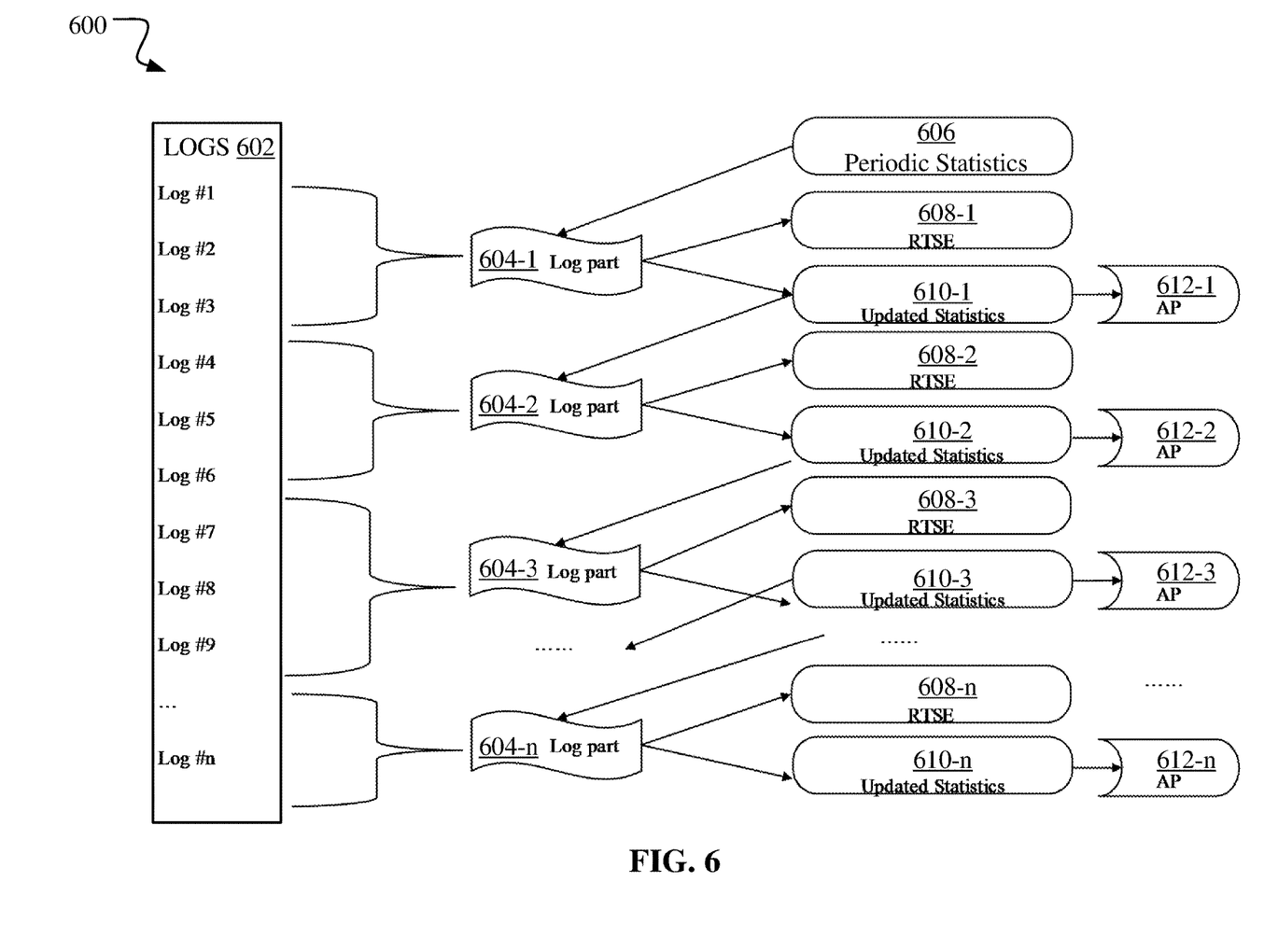
FIG. 6 is a data flow diagram of a method for dynamic access paths, in accordance with embodiments of the present disclosure.

FIG. 6 is a data flow diagram of a method 600 for dynamic access paths, in accordance with embodiments of the present disclosure. The access path manager 218 can perform the method 600, which can represent operations 502 through 510 of the method 500 described with respect to FIG. 5.

Referring back to FIG. 6, on the left side of the diagram, the logs 602 can represent database logs, such as the database logs 222. The logs can include logs #1 through n. Each log can represent a single transaction, such as index or table update. In accordance with some embodiments, the access path manager 218 can generate log parts 604-1 through 604-*n* (referenced collectively as log parts 604) from the logs 602. Each log part 604 can include multiple logs.

As stated previously, the access path manager 218 can determine periodic statistics, such as periodic statistics 606, shown towards the top right side of the diagram. The periodic statistics 606 can be similar to the periodic statistics 214. Thus, the access path manager 218 can combine the periodic statistics 606 with the log part 604-1 to generate an RTS estimate (RTSE) 608-1 and updated statistics 610-1. The RTSE 608-1 can include parameter values of the RTS 300, for example, determined as represented by the log part 604-1. The updated statistics 610-1 can represent the database state where the periodic statistics 606 are adjusted by the RTSE 608-1. Further, the access path manager 218 can provide the updated statistics 610-1 to the optimizer 220, which can generate an access path (AP) 612-1. The access path 612-1 can represent an efficient access path for executing when the database state is similar to that represented in the updated statistics 610-1.

Moving down the diagram, the updated statistics 610-1, 2, 3, are thus input to subsequent repetitions, whereby the updated statistics 610-$n$ is combined with log part 604-$n$+1, to generate RTSE 608-$n$+1 and updated statistics 610-$n$+1. Accordingly, access paths 612-$n$+1 are thus generated based on the new round of updated statistics. In this way, the access path manager 218 can generate access paths up to n access paths 612 for various RTS scenarios.

Figure 7:
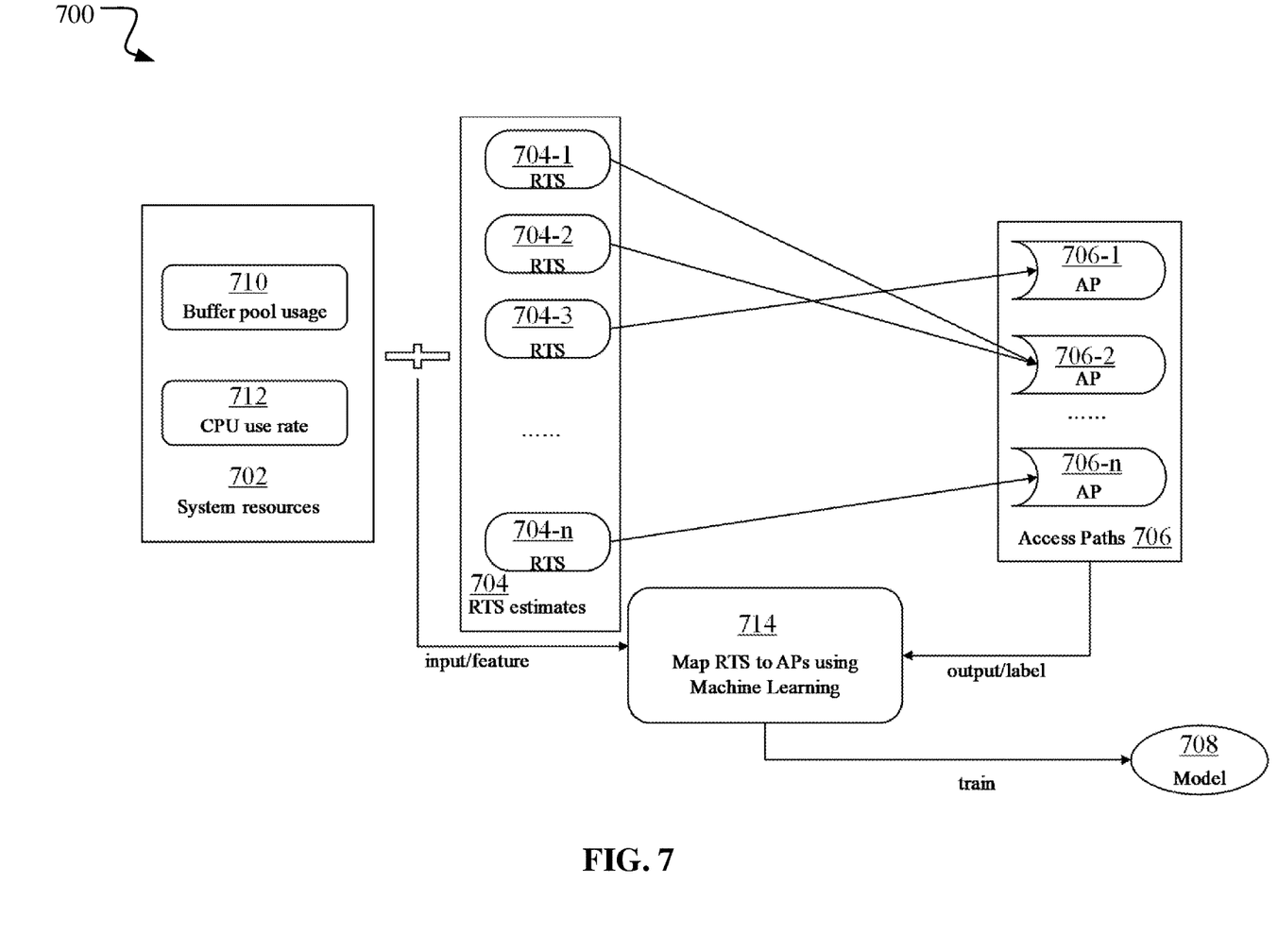
FIG. 7 is a block diagram of a system for dynamic access paths, in accordance with embodiments of the present disclosure.

FIG. 7 is a block diagram of a system 700 for dynamic access paths, in accordance with embodiments of the present disclosure. The access path manager 218 may use the system 700 may to perform operation 512 of the method 500 described with respect to FIG. 5. The system 700 includes system resources 702, RTS estimates 704, access paths 706, and a model 708. The system resources 702 may be similar to the system resources 110, described with respect to FIG. 1. The system resources 702 can represent hardware and software resources available to a computing system, such as a server that is hosting a database. The system resources can include, for example, buffer pool usage 710 and central processing unit (CPU) use rate 712. The buffer pool usage 710 can represent how much of a shared buffer pool of memory is currently being used by the computing system. Similarly, the CPU use rate 712 can represent how much of the shared processing power of a CPU is being used by the computing system.

The RTS estimates 704 can be similar to the RTS estimates 608 described with respect to FIG. 6. The access paths 706 can represent the access paths 212, specifically, the multiple access paths that are generated for a single SQL command based on different database states.

In the system 700, the access path manager 218 can input features of a database, including the system resources 702 and RTS estimates 704 to a mapping process 714, that outputs a label based on the access paths 706 that are available. In this way, the access path manager 218 may train the model 708. The arrows from the RTS estimates 704 to the access paths 706. Additionally, it is possible to use multiple features of the database 208 based on information about the tables, columns, indices to generate unique RTS estimates 704. For example, RTS estimates 704 can be based on the total rows in a table, the number of active pages in a table space, the total number of bytes that row data occupy in data rows. Thus, the access path manager 218 can train the model 708 by classification algorithms. For example, the access path manager 218 can use 100 RTS estimates 704 for training samples and 30 RTS estimates 704 for testing the model 708.

Figure 8:
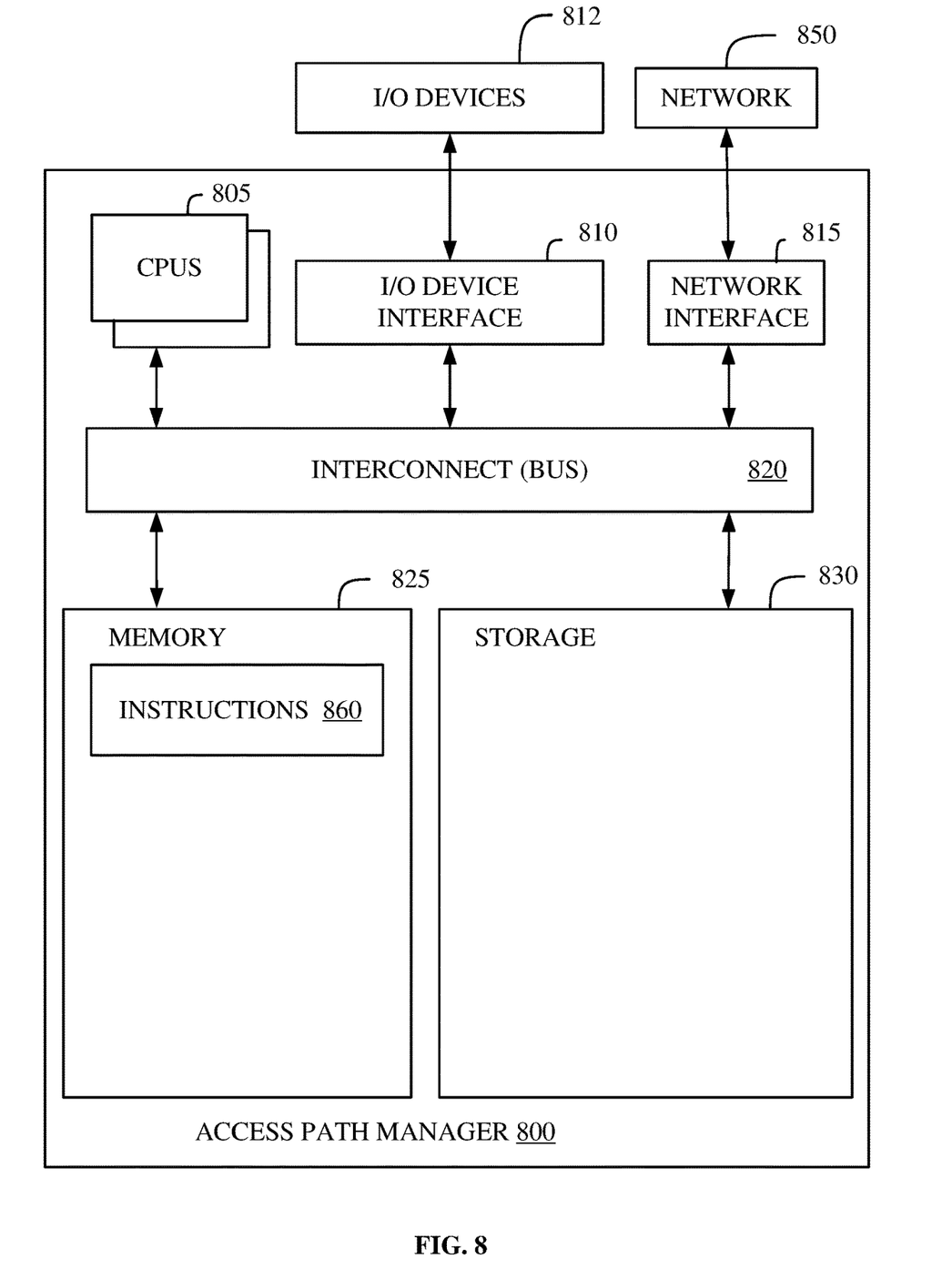
FIG. 8 is a block diagram of an example classifying chart digitization (CCD) manager, in accordance with some embodiments of the present disclosure.

Referring now to FIG. 8, illustrated is a block diagram of an example access path manager 800, in accordance with some embodiments of the present disclosure. In various embodiments, the access path manager 800 is similar to the access path manager 218 and can perform the methods described in FIGS. 4-6 and/or the functionality discussed in FIGS. 1-3 and 7. In some embodiments, the access path manager 800 provides instructions for the aforementioned methods and/or functionalities to a client machine such that the client machine executes the method, or a portion of the method, based on the instructions provided by the access path manager 800. In some embodiments, the access path manager 800 comprises software executing on hardware incorporated into a plurality of devices.

The access path manager 800 includes a memory 825, storage 830, an interconnect (e.g., BUS) 820, one or more CPUs 805 (also referred to as processors 805 herein), an I/O device interface 810, I/O devices 812, and a network interface 815.

Each CPU 805 retrieves and executes programming instructions stored in the memory 825 or the storage 830. The interconnect 820 is used to move data, such as programming instructions, between the CPUs 805, I/O device interface 810, storage 830, network interface 815, and memory 825. The interconnect 820 can be implemented using one or more busses. The CPUs 805 can be a single CPU, multiple CPUs, or a single CPU having multiple processing cores in various embodiments. In some embodiments, a CPU 805 can be a digital signal processor (DSP). In some embodiments, CPU 805 includes one or more 3D integrated circuits (3DICs) (e.g., 3D wafer-level packaging (3DWLP), 3D interposer based integration, 3D stacked ICs (3D-SICs), monolithic 3D ICs, 3D heterogeneous integration, 3D system in package (3DSiP), and/or package on package (PoP) CPU configurations). Memory 825 is generally included to be representative of a random access memory (e.g., static random access memory (SRAM), dynamic random access memory (DRAM), or Flash). The storage 830 is generally included to be representative of a non-volatile memory, such as a hard disk drive, solid state device (SSD), removable memory cards, optical storage, and/or flash memory devices. Additionally, the storage 830 can include storage area-network (SAN) devices, the cloud, or other devices connected to the access path manager 800 via the I/O device interface 810 or to a network 850 via the network interface 815.

In some embodiments, the memory 825 stores instructions 860. However, in various embodiments, the instructions 860 are stored partially in memory 825 and partially in storage 830, or they are stored entirely in memory 825 or entirely in storage 830, or they are accessed over a network 850 via the network interface 815.

Instructions 860 can be processor-executable instructions for performing any portion of, or all, any of the methods of FIGS. 4-6 and/or the functionality discussed in FIGS. 1-3 and 7.

In various embodiments, the I/O devices 812 include an interface capable of presenting information and receiving input. For example, I/O devices 812 can present information to a listener interacting with access path manager 800 and receive input from the listener.

The access path manager 800 is connected to the network 850 via the network interface 815. Network 850 can comprise a physical, wireless, cellular, or different network.

In some embodiments, the access path manager 800 can be a multi-user mainframe computer system, a single-user system, or a server computer or similar device that has little or no direct user interface but receives requests from other computer systems (clients). Further, in some embodiments, the access path manager 800 can be implemented as a desktop computer, portable computer, laptop or notebook computer, tablet computer, pocket computer, telephone, smart phone, network switches or routers, or any other appropriate type of electronic device.

It is noted that FIG. 8 is intended to depict the representative major components of an exemplary access path manager 800. In some embodiments, however, individual components can have greater or lesser complexity than as represented in FIG. 8, components other than or in addition to those shown in FIG. 8 can be present, and the number, type, and configuration of such components can vary.

Although this disclosure includes a detailed description on cloud computing, implementation of the teachings recited herein are not limited to a cloud computing environment. Rather, embodiments of the present disclosure are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model can include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but can be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It can be managed by the organization or a third party and can exist on-premises or off-premises.

Community cloud: the cloud infrastructure is shared by several organizations and supports a specific community that has shared concerns (e.g., mission, security requirements, policy, and compliance considerations). It can be managed by the organizations or a third party and can exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 9:
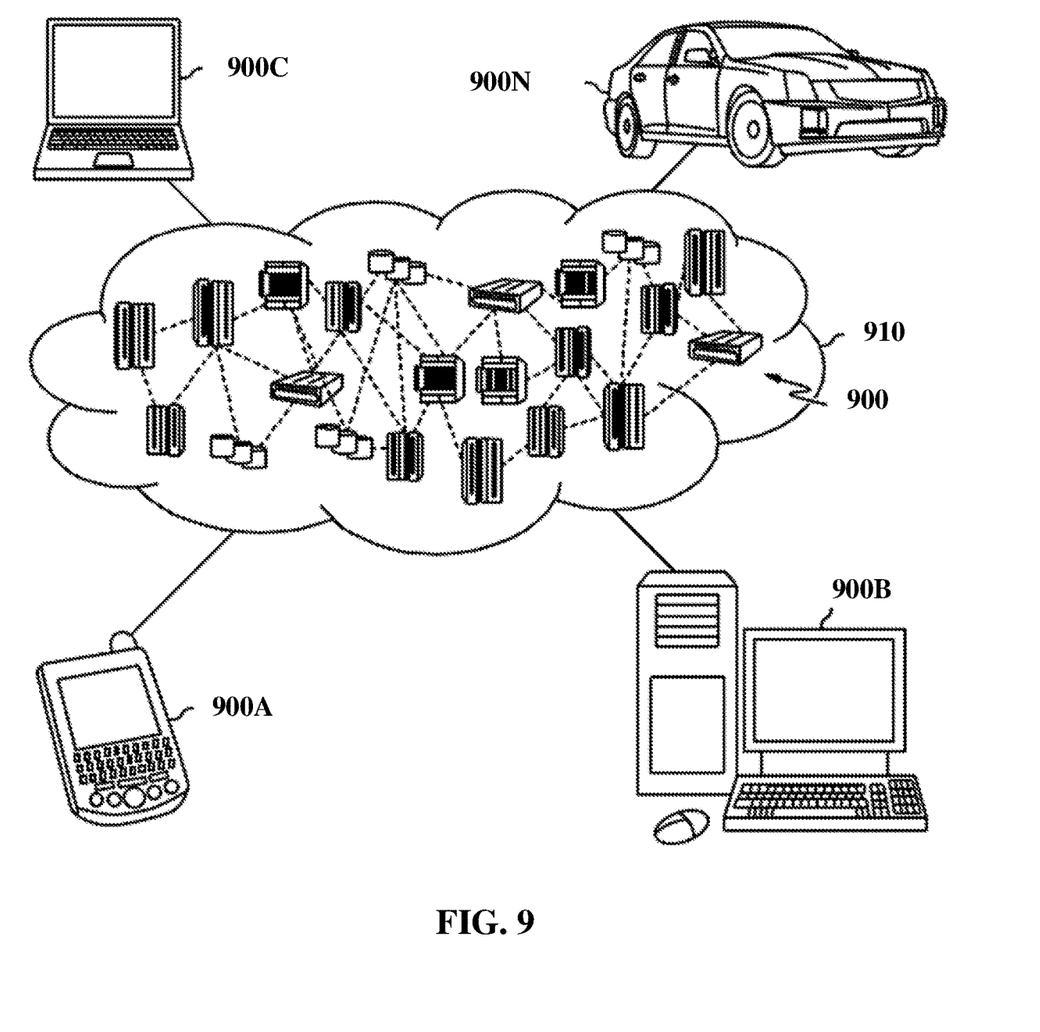
FIG. 9 depicts a cloud computing environment, according to some embodiments of the present disclosure.

Referring now to FIG. 9, which depicts a cloud computing environment 910, according to some embodiments of the present disclosure. As shown, cloud computing environment 910 includes one or more cloud computing nodes 900. The cloud computing nodes 900 can perform the methods described in FIGS. 4-6 and/or the functionality discussed in FIGS. 1-3 and 7. Additionally, cloud computing nodes 900 can communicate with local computing devices used by cloud consumers, such as, for example, personal digital assistant (PDA) or cellular telephone 900A, desktop computer 900B, laptop computer 900C, and/or automobile computer system 900N. Further, the cloud computing nodes 900 can communicate with one another. The cloud computing nodes 900 can also be grouped (not shown) physically or virtually, in one or more networks, such as Private, Community, Public, or Hybrid clouds as described hereinabove, or a combination thereof. This allows cloud computing environment 910 to offer infrastructure, platforms and/or software as services for which a cloud consumer does not need to maintain resources on a local computing device. It is understood that the types of computing devices 900A-N shown in FIG. 9 are intended to be illustrative only and that computing nodes 900 and cloud computing environment 910 can communicate with any type of computerized device over any type of network and/or network addressable connection (e.g., using a web browser).

Figure 10:
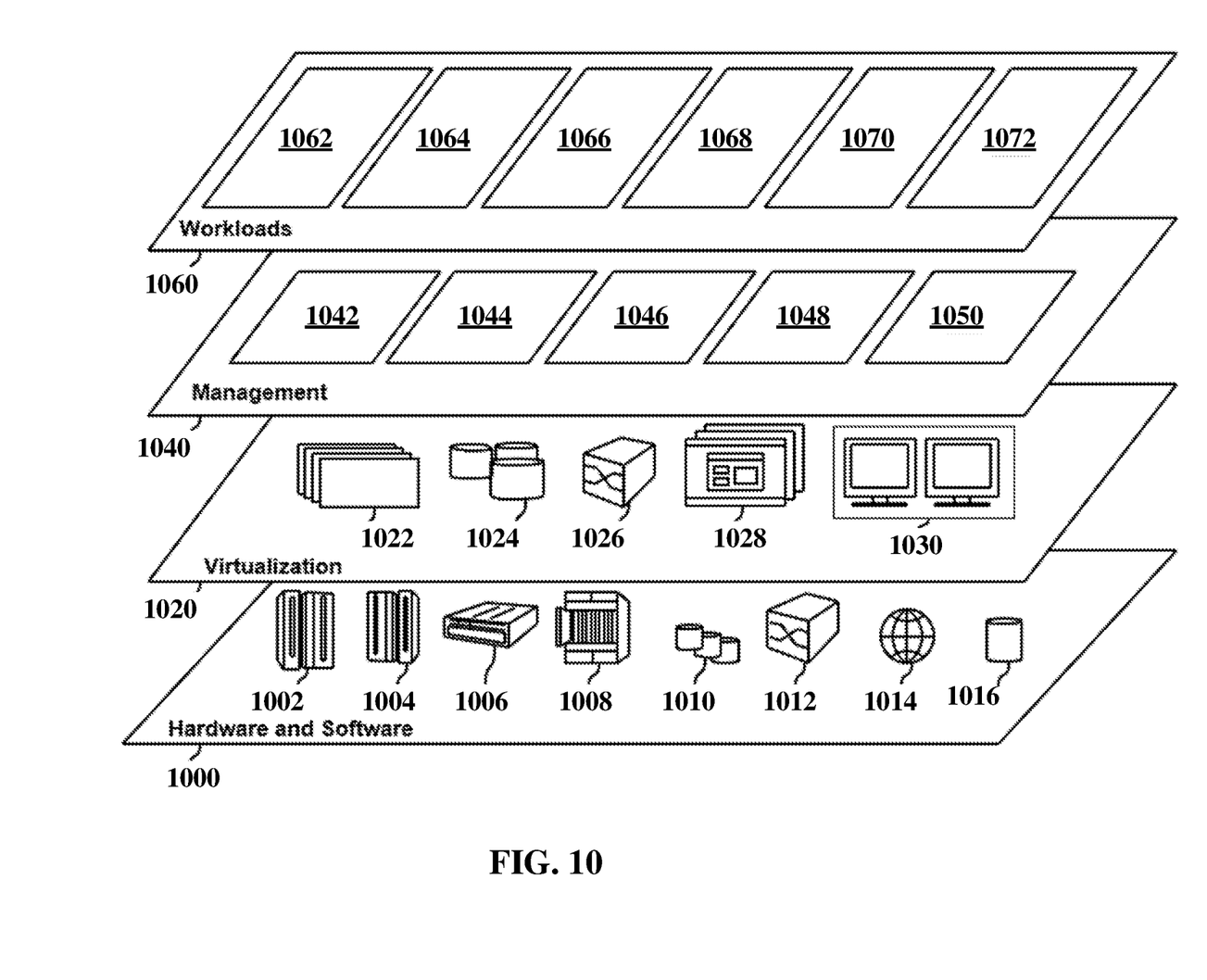
FIG. 10 depicts abstraction model layers, according to some embodiments of the present disclosure.

Referring now to FIG. 10, a set of functional abstraction model layers provided by cloud computing environment 910 (FIG. 9), according to some embodiments of the present disclosure, is shown. It should be understood in advance that the components, layers, and functions shown in FIG. 10 are intended to be illustrative only and embodiments of the disclosure are not limited thereto. As depicted below, the following layers and corresponding functions are provided.

Hardware and software layer 1000 includes hardware and software components. Examples of hardware components include: mainframes 1002; RISC (Reduced Instruction Set Computer) architecture based servers 1004; servers 1006; blade servers 1008; storage devices 1010; and networks and networking components 1012. In some embodiments, software components include network application server software 1014 and database software 1016.

Virtualization layer 1020 provides an abstraction layer from which the following examples of virtual entities can be provided: virtual servers 1022; virtual storage 1024; virtual networks 1026, including virtual private networks; virtual applications and operating systems 1028; and virtual clients 1030.

In one example, management layer 1040 can provide the functions described below. Resource provisioning 1042 provides dynamic procurement of computing resources and other resources that are utilized to perform tasks within the cloud computing environment. Metering and Pricing 1044 provide cost tracking as resources are utilized within the cloud computing environment, and billing or invoicing for consumption of these resources. In one example, these resources can include application software licenses. Security provides identity verification for cloud consumers and tasks, as well as protection for data and other resources. User portal 1046 provides access to the cloud computing environment for consumers and system administrators. Service level management 1048 provides cloud computing resource allocation and management such that required service levels are met. Service level management 1048 can allocate suitable processing power and memory to process static sensor data. Service Level Agreement (SLA) planning and fulfillment 1050 provide pre-arrangement for, and procurement of, cloud computing resources for which a future requirement is anticipated in accordance with an SLA.

Workloads layer 1060 provides examples of functionality for which the cloud computing environment can be utilized. Examples of workloads and functions which can be provided from this layer include: mapping and navigation 1062; software development and lifecycle management 1064; virtual classroom education delivery 1066; data analytics processing 1068; transaction processing 1070; and access path manager 1072.

The present disclosure may be a system, a method, and/or a computer program product at any possible technical detail level of integration. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/ or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A computer-implemented method for generating dynamic access paths, comprising:
   generating a plurality of real-time statistics (RTS) estimates based on a log of a database;
   generating a plurality of access paths based on a structured query language command and the RTS estimates, wherein generating the access paths comprises invoking an optimizer of the database to generate the access paths based on the RTS estimates; and
   training a machine learning model to map the RTS estimates to the access paths.

2. The method of claim 1, further comprising:
   determining a current RTS for the database; and
   determining an efficient access path based on the current RTS by using the machine learning model.

3. The method of claim 2, wherein training the machine learning model comprises mapping the RTS estimates and potential system resources associated with the database to the access paths.

4. The method of claim 3, further comprising determining current system resources, wherein determining the efficient access path comprises determining the efficient access path based on the current system resources.

5. The method of claim 2, further comprising identifying the efficient access path to an executive component of the database.

6. The method of claim 5, further comprising executing the efficient access path.

7. The method of claim 1, further comprising determining periodic statistics of the database, wherein generating the access paths is further based on the periodic statistics.

8. A computer program product comprising program instructions stored on a computer readable storage medium, wherein the computer readable storage medium is not a transitory signal per se, the program instructions executable by a processor to cause the processor to perform a method comprising:
   generating a plurality of real-time statistics (RTS) estimates based on a log of a database;
   determining periodic statistics of the database;
   generating a plurality of access paths based on a structured query language command, the RTS estimates, and the periodic statistics, wherein generating the access paths comprises invoking an optimizer of the database to generate the access paths based on the RTS estimates; and
   training a machine learning model to map the RTS estimates to the access paths.

9. The computer program product of claim 8, further comprising:
   determining a current RTS for the database; and
   determining an efficient access path based on the current RTS by using the machine learning model.

10. The computer program product of claim 9, wherein training the machine learning model comprises mapping the RTS estimates and potential system resources associated with the database to the access paths.

11. The computer program product of claim 10, further comprising determining current system resources, wherein determining the efficient access path comprises determining the efficient access path based on the current system resources.

12. The computer program product of claim 9, further comprising identifying the efficient access path to an executive component of the database.

13. The computer program product of claim 12, further comprising executing the efficient access path.

14. A system comprising:
    a computer processing circuit; and
    a computer-readable storage medium storing instructions, which, when executed by the computer processing circuit, are configured to cause the computer processing circuit to perform a method comprising:
    generating a plurality of real-time statistics (RTS) estimates based on a log of a database;
    generating a plurality of access paths based on a structured query language command and the RTS estimates, wherein generating the access paths comprises invoking an optimizer of the database to generate the access paths based on the RTS estimates; and
    training a machine learning model to map the RTS estimates to the access paths.

15. The system of claim 14, further comprising:
    determining a current RTS for the database;
    determining an efficient access path based on the current RTS by using the machine learning model, wherein training the machine learning model comprises mapping the RTS estimates and potential system resources associated with the database to the access paths; and
    determining current system resources, wherein determining the efficient access path comprises determining the efficient access path based on the current system resources.

16. The system of claim 15, the method further comprising:
 identifying the efficient access path to an executive component of the database; and
 executing the efficient access path.

17. The system of claim 14, the method further comprising determining periodic statistics of the database, wherein generating the access paths is further based on the periodic statistics.

* * * * *